(12) United States Patent
Miura et al.

(10) Patent No.: US 7,262,913 B2
(45) Date of Patent: Aug. 28, 2007

(54) CHROMATIC DISPERSION AND DISPERSION SLOPE COMPENSATING APPARATUS

(75) Inventors: Akira Miura, Kawasaki (JP); Hiroki Ooi, Kawasaki (JP); Yasuhiro Yamauchi, Kawasaki (JP); Yoshinobu Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 11/168,433

(22) Filed: Jun. 29, 2005

(65) Prior Publication Data

US 2006/0203344 A1    Sep. 14, 2006

(30) Foreign Application Priority Data

Mar. 14, 2005    (JP)    ............. 2005-070534

(51) Int. Cl.
H04J 14/02    (2006.01)
G02B 5/18    (2006.01)
G02B 27/44    (2006.01)

(52) U.S. Cl. ............. 359/566; 359/589; 398/81; 398/147

(58) Field of Classification Search ............. 359/566, 359/584, 589; 398/81, 147
See application file for complete search history.

(56) References Cited

U.S. PATENT DOCUMENTS

| | | |
|---|---|---|
| 5,930,045 A | 7/1999 | Shirasaki |
| 6,441,959 B1 | 8/2002 | Yang et al. |
| 6,646,805 B2 | 11/2003 | Mitamura et al. |
| 6,807,008 B2 * | 10/2004 | Mitamura ............. 359/577 |
| 2002/0012179 A1 | 1/2002 | Cao et al. |
| 2005/0180748 A1 | 8/2005 | Kawahata |
| 2005/0213215 A1 * | 9/2005 | Mitamura et al. ........ 359/589 |
| 2006/0198024 A1 * | 9/2006 | Yamauchi et al. ........ 359/577 |
| 2006/0215286 A1 * | 9/2006 | Okada et al. ............ 359/868 |

FOREIGN PATENT DOCUMENTS

| | | |
|---|---|---|
| EP | 1 237 308 | 9/2002 |
| JP | 2000-511655 | 9/2000 |
| JP | 2002-258207 | 11/2002 |
| WO | 2004/084440 | 9/2004 |

OTHER PUBLICATIONS

European Search Reportt in corresponding Application No. 05014024.3-2216 mailed Oct. 21, 2005.
U.S. Appl. No. 10/901,219, filed Jul. 29, 2004, Nobuaki Mitamura et al., Fujitsu Limited of Kawasaki, Japan.

* cited by examiner

Primary Examiner—Fayez G. Assaf
(74) Attorney, Agent, or Firm—Staas & Halsey LLP

(57) ABSTRACT

In a chromatic dispersion and dispersion slope compensating apparatus according to the present invention, a WDM light which has been angularly dispersed to a first direction by a VIPA plate, is angularly dispersed to a second direction vertical to the first direction by a diffraction grating, and optical signals of respective wavelengths output from the diffraction grating are reflected by any one of a plurality of three-dimensional mirrors having reflective surfaces of curved shapes different from each other, to be returned to the VIPA plate. Thus, with a simple control mechanism in which the plurality of three-dimensional mirrors are moved to only the second direction, an apparatus capable of variably compensating for the chromatic dispersion and the dispersion slope independent of each other can be provided.

7 Claims, 10 Drawing Sheets

DISPERSION SLOPE = -10 ps/nm²

DISPERSION SLOPE = -5 ps/nm²

DISPERSION SLOPE = 0 ps/nm²

DISPERSION SLOPE = +5 ps/nm²

DISPERSION SLOPE = +10 ps/nm²

CHROMATIC DISPERSION AND DISPERSION SLOPE COMPENSATING APPARATUS

BACKGROUND OF THE INVENTION

1. Field of the Invention

The present invention relates to an apparatus for compensating for the chromatic dispersion and the dispersion slope generated in optical signals of respective wavelengths which are contained in a wavelength division multiplexed light transmitted through an optical fiber transmission path, and in particular, to an apparatus capable of variably compensating for the chromatic dispersion and the dispersion slope independent of each other.

2. Description of the Related Art

In an optical transmission system, it is necessary to perform the chromatic dispersion compensation, in order to suppress the wavelength deterioration which occurs due to a difference between optical fiber propagation times of respective wavelength components of modulated optical signals. As one of conventional chromatic dispersion compensators, there has been known, for example, a chromatic dispersion compensator configured by utilizing a so-called virtually imaged phased array (VIPA) for demultiplexing a signal light into a plurality of optical beams that can be distinguished spatially according to wavelengths (for example, a plurality of optical beams that travel to different directions) (refer to Japanese National Publication No. 2000-511655).

Here, there will be briefly described a conventional VIPA-type chromatic dispersion compensator.

FIG. 13 is a perspective view showing a configuration example of the conventional VIPA-type chromatic dispersion compensator. Further, FIG. 14 is a top view of the configuration example of FIG. 13.

As shown in each figure, in the conventional VIPA-type chromatic dispersion compensator, a light emitted from one end of an optical fiber 130 via an optical circulator 120 is converted into a parallel light by a collimate lens 140 and, then, condensed on one segment by a line focusing lens 150 and passes through a radiation window 116 of a VIPA plate 110 to be incident between opposed parallel planes. The incident light on the VIPA plate 110 is multiple-reflected repeatedly, for example, between a reflective multilayer film 112 formed on one plane of the VIPA plate 110 and having the reflectance lower than 100% and a reflective multilayer film 114 formed on the other plane and having the reflectance of substantially 100%. At this time, every time the incident light is reflected on the surface of the reflective multilayer film 112, a few % of the light is transmitted through the surface to be emitted outside the VIPA plate 110.

The lights transmitted through the VIPA plate 110 interfere mutually and form a plurality of optical beams, traveling directions of which are different from each other, according to wavelengths. As a result, if each of the optical beams is condensed to one point by a convergent lens 160, each condensed position moves on a straight line according to variation of the wavelengths. By disposing, for example, a three-dimensional mirror 170 on the straight line, the lights that have been emitted from the VIPA plate 110 and condensed by the convergent lens 160 are reflected at different positions on the three-dimensional mirror 170 according to respective wavelengths to be returned to the VIPA plate 110. Since the lights reflected on the three-dimensional mirror 170 travel to different directions according to wavelengths, optical paths thereof are deviated when they are returned to the VIPA plate 110. The optical path deviation amounts are changed according to wavelengths, so that different wavelength components are propagated for different distances and, therefore, the chromatic dispersion of the input light is compensated.

In consideration of a model as shown in FIG. 15, for example, behavior of the light that is multiple-reflected by the VIPA plate 110 as described above is similar to that in an Echelon grating that is well-known as a step-wise diffraction grating. Therefore, the VIPA plate 110 can be considered as a virtual diffraction grating. Further, in consideration of an interference condition in the VIPA plate 110, as shown on the right side in FIG. 15, the emitted light interferes under a condition in which, with an optical axis thereof as a reference, a shorter wavelength is above the optical axis and a longer wavelength is below the optical axis. Therefore, among a plurality of optical signals of respective wavelengths, optical signals on the shorter wavelength side are output above the optical axis and optical signals on the longer wavelength side are output below the optical axis. Such a conventional VIPA-type chromatic dispersion compensator has advantages in that the chromatic dispersion can be compensated over a wide range and also the wavelength (transmitted wavelength) of the optical signal to be compensated can be varied.

Further, in a system for transmitting a wavelength division multiplexed (WDM) light containing a plurality of optical signals having different wavelengths, since it is necessary to perform the appropriate chromatic dispersion compensation on the optical signals of respective wavelengths, there is a case where also the wavelength dependence of chromatic dispersion, which is called the dispersion slope, is required to be compensated. Combinations of the chromatic dispersion and the dispersion slope, which are to be compensated, exist in countless numbers, since there are countless combinations of the type of optical fiber and the length of optical fiber transmission path. Therefore, there is demanded an apparatus capable of variably compensating the chromatic dispersion and the dispersion slope independent of each other.

As a conventional technology for variably compensating for the chromatic dispersion and the dispersion slope independent of each other, as shown in FIG. 16 for example, there has been proposed an apparatus in which, in the above described VIPA-type chromatic dispersion compensator, there is disposed means 180 for generating the optical path deviation between the lights of respective wavelengths angularly dispersed by the VIPA plate 110 in parallel according to the wavelengths, in a direction vertical to an angular dispersion direction of the lights, so that the chromatic dispersion and the dispersion slope, which are to be given to the optical signals of respective wavelengths contained in the WDM light, can be controlled independent of each other (refer to Japanese Unexamined Patent Publication No. 2002-258207).

However, in the conventional chromatic dispersion and dispersion slope compensating apparatus utilizing the VIPA described above, there is a problem of requiring a complicated control mechanism. Namely, the conventional apparatus needs to be disposed with a mechanism controlling a position of the three-dimensional mirror 170 in order to compensate for the chromatic dispersion, and the means 180 for generating the optical path deviation in the direction vertical to the angular dispersion direction of the VIPA in order to variably compensate for the dispersion slope, to be specific, a parallel plate composed of a transparent material having the refractive index chromatic dispersion or two prisms, or a mechanism controlling two diffraction gratings.

If the optical path deviation amount is varied by controlling the means 180 such as the parallel plate or the like, in order to vary a compensation amount of the chromatic dispersion, the optical paths themselves of the respective wavelengths toward the three-dimensional mirror 170 are also deviated overall and a compensation amount of the chromatic dispersion is changed. Therefore, these mechanisms need to be controlled in association with each other. However, for operating the three-dimensional mirror 170 in association with the means 180 to move them for an infinitesimal distance, a complicated adjusting mechanism is needed. But, the designing and the manufacturing of such an adjusting mechanism are not easy and an enormous cost is required. Therefore, there has been a problem in that the conventional apparatus is actually hard to be in practical use.

SUMMARY OF THE INVENTION

The present invention has been accomplished in view of the above problems and has an object to provide a low cost apparatus capable of variably compensating for the chromatic dispersion and the dispersion slope independent of each other, with a simple control mechanism.

In order to achieve the above object, the present invention provides a chromatic dispersion and dispersion slope compensating apparatus comprising: an optical system which receives a wavelength division multiplexed light containing a plurality, of optical signals having different wavelengths, and condenses the wavelength division multiplexed light in a one-dimensional direction to output it; an optical component including two reflective surfaces which are opposed and parallel to each other, in which the wavelength division multiplexed light output from the optical system is incident between the reflective surfaces, and a part of the incident light is transmitted through one of the reflective surfaces while the incident light being multiple-reflected on the respective reflective surfaces, and then, the transmitted light interferes mutually, so that, for each of the optical signals of respective wavelengths contained in the wavelength division multiplexed light, the light dispersed to a first direction at different angles according to wavelengths is output; a diffraction grating which disperses the optical signals of respective wavelengths output from the optical component to a second direction vertical to the first direction at different angles according to wavelengths; a reflecting section that comprises a plurality of three-dimensional mirrors each having a reflective surface of curved surface shape whose curvature in the first direction is changed along the second direction, in which change rates of the curvatures in the first direction to the second direction are different from each other; and a movable stage in which the plurality of three-dimensional mirrors of the reflecting section are moved to the second direction corresponding to respective compensation amounts of the chromatic dispersion and the dispersion slope, and the optical signals of respective wavelengths output from the diffraction grating are reflected by any one of the plurality of three-dimensional mirrors of the reflecting section, and then, the reflected light is returned to the optical component via the diffraction grating.

In the chromatic dispersion and dispersion slope compensating apparatus of the above configuration, the above optical component is equivalent to the conventional VIPA described above, the diffraction grating is disposed between the optical component and the reflecting section, and in this diffraction grating, the optical signals of respective wavelengths output from the optical component are angularly dispersed to the second direction, that is, the direction vertical to an angular dispersion direction of the optical component. As a result, the optical signals of respective wavelengths angularly dispersed to the second direction are sent to the reflecting section, to be reflected by any one of the plurality of three-dimensional mirrors. At this time, since the optical signals of respective wavelengths are reflected on the reflective surface whose curvature in the first direction is changed along the second direction, the different chromatic dispersion is given to the optical signals of respective wavelengths so that the dispersion slope is compensated. Further, the change rates in the first direction to the second direction of the plurality of three-dimensional mirrors are different from each other. Therefore, by moving the plurality of three-dimensional mirrors to the second direction by the movable stage to replace the three-dimensional mirror which reflects the output light from the diffraction grating, it becomes to vary the compensation amount of the dispersion slope.

According to the above chromatic dispersion and dispersion slope compensating apparatus of the present invention as described above, it is possible to variably compensate for the chromatic dispersion and the dispersion slope independent of each other, with the simple control mechanism which moves the plurality of three-dimensional mirrors of the reflecting section to the second direction. Thus, it becomes possible to provide the chromatic dispersion and dispersion slope compensating apparatus which is easy to be in practical use and is at a low cost.

The other objects, features and advantages of the present invention will be apparent from the following description of the embodiments with reference to the accompanying drawings.

DETAILED DESCRIPTION OF THE INVENTION

Figure 1:
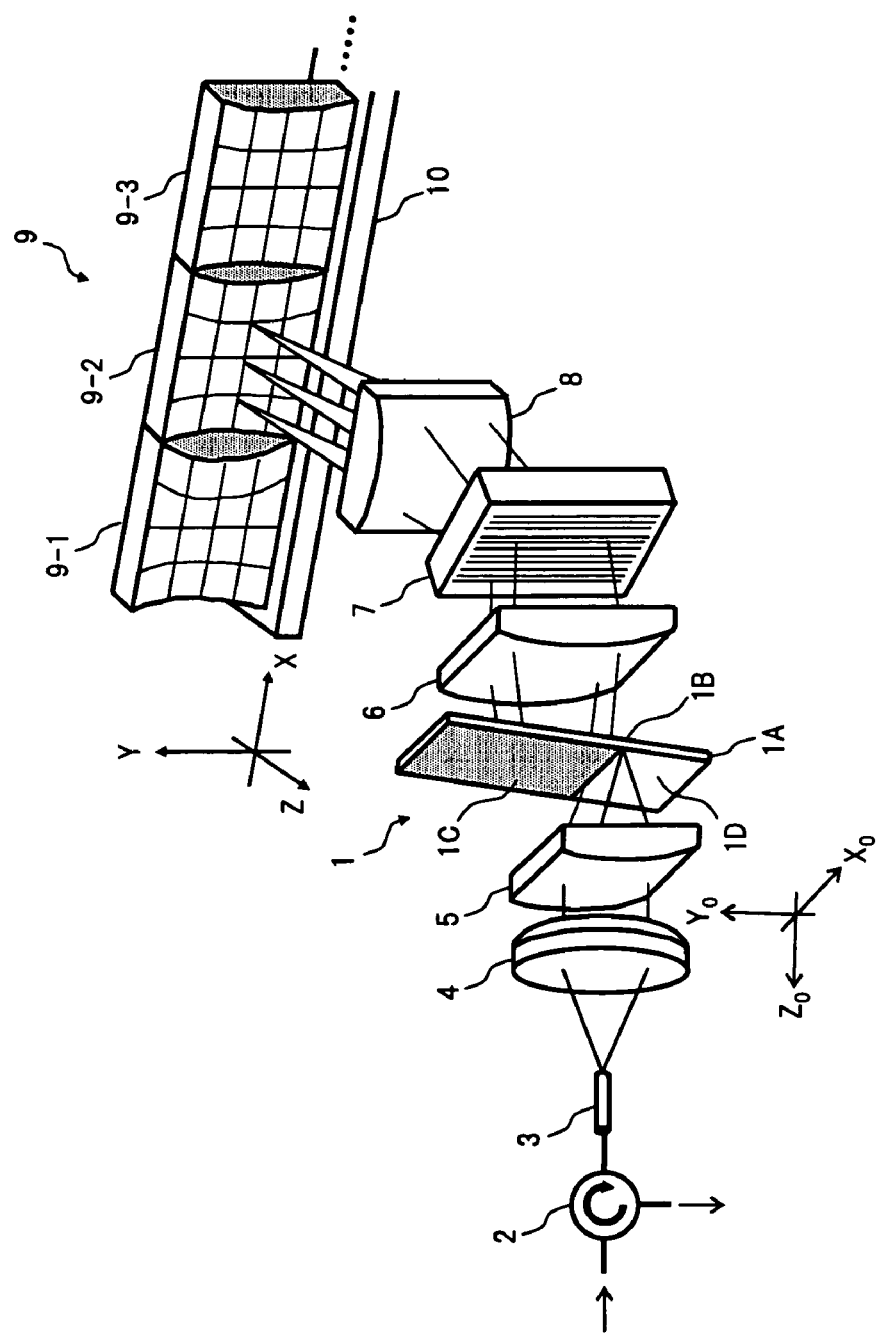
FIG. 1 is a perspective view showing a configuration of one embodiment of a chromatic dispersion and dispersion slope compensating apparatus according to the present invention.

Hereinafter, embodiments of the present invention will be described with reference to drawings. The same reference numerals denote the same or equivalent parts in all drawings.

Figure 2:
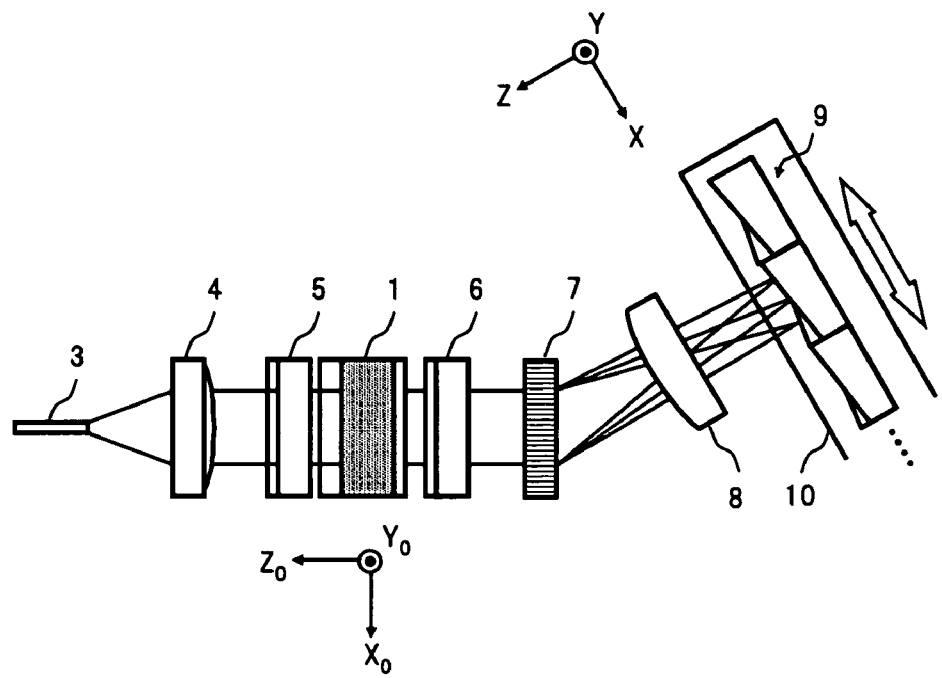
FIG. 2 is a top view of the configuration in FIG. 1.

FIG. 1 is a perspective view showing a configuration of one embodiment of a chromatic dispersion and dispersion slope compensating apparatus according to the present invention. Further, FIG. 2 is a top view of the configuration in FIG. 1.

In FIG. 1, the apparatus in the present embodiment comprises, for example: a VIPA plate 1 as an optical component having two reflective surfaces which are opposed and parallel to each other; an optical system which consists of an optical circulator 2, an optical fiber 3, a collimate lens 4 and a cylindrical lens 5, enabling a WDM light condensed on one segment to be incident on a radiation window 1D of the VIPA plate 1; a cylindrical lens 6 (first lens), a diffraction grating 7 and a cylindrical lens 8 (second lens), which are sequentially given with a light multi-reflected on the VIPA plate 1 to be emitted from one of the reflective surfaces; a reflecting section 9 that reflects the light passed through the cylindrical lens 8 to return it to the VIPA plate 1 via the cylindrical lens 8, the diffraction grating 7 and the cylindrical lens 6; and a movable stage 10 on which the reflecting section 9 is mounted.

Figure 13:
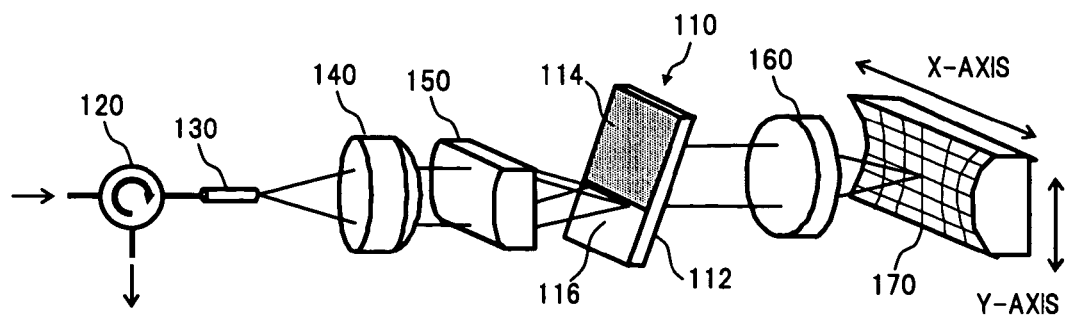
FIG. 13 is a perspective view showing a configuration example of a conventional VIPA-type chromatic dispersion compensator.
Figure 14:
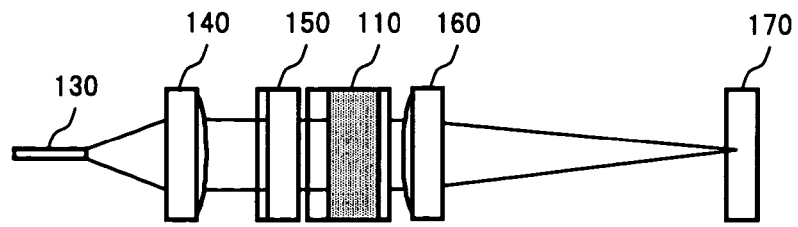
FIG. 14 is a top view of the configuration example in FIG. 13.
Figure 15:
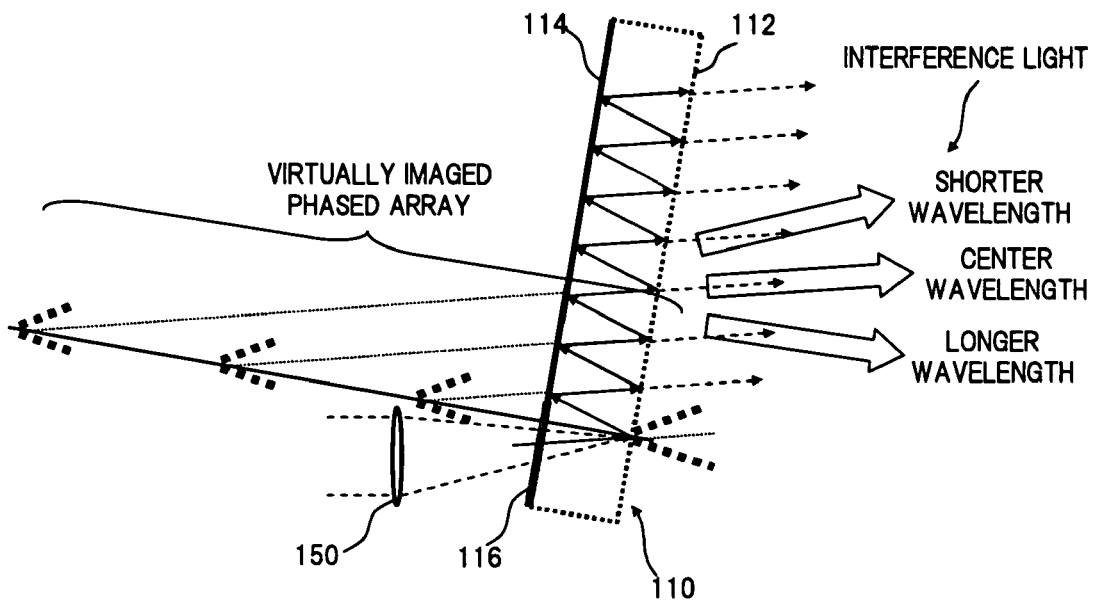
FIG. 15 is a diagram showing a model for explaining an operation theory of a conventional VIPA.
Figure 16:
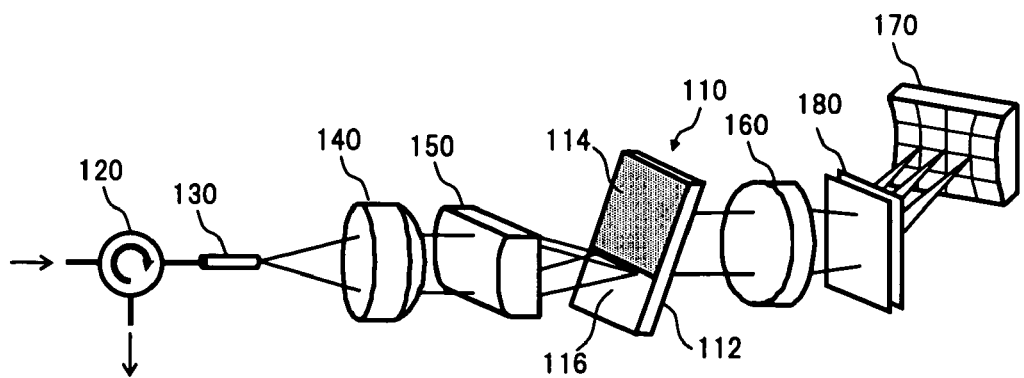
FIG. 16 is a perspective view showing a configuration example of a chromatic dispersion and dispersion slope compensating apparatus utilizing a conventional VIPA.

Similar to a conventional configuration shown in FIG. 13 described above, the VIPA plate 1 includes a substrate 1A provided with parallel planes opposed to each other, a reflective multilayer film 1B formed on one of the parallel planes of the substrate 1A, and a reflective multilayer film 1C and the radiation window 1D formed on the other of the parallel planes. The VIPA plate 1 is tilted by a required angle from an angle at which an optical axis of the WDM light incident on the radiation window 1D is incident vertically. The reflective multilayer film 1B has the reflectance lower than 100% (preferably about 95-98%) with respect to the WDM light incident from the radiation window 1D and is formed on the entirety of one of the planes of the substrate 1A. The reflective multilayer film 1C has the reflectance of substantially 100% with respect to the WDM light incident from the radiation window 1D and is formed on a part of the other plane of the substrate 1A. Another part of the other plane of the substrate 1A, on which the reflective multilayer film 1C is not formed, is the radiation window 1D transparent to the WDM light.

The optical circulator 2 is a typical optical component including three ports, for example, and transmitting a light in directions from a first port to a second port, from the second port to a third port and from the third port to the first port. Here, the WDM light input to the present apparatus is given to the first port of the optical circulator 2 and sent to one end of the optical fiber 3 via the second port, while the WDM light returned to the other end of the optical fiber 3 is output from the third port via the second port as an output light of the present apparatus.

The optical fiber 3 is, for example, a single-mode optical fiber and the like, one end thereof being connected with the second port of the optical circulator 2 and the other end being arranged in the vicinity of the collimate lens 4. Note, the type of the optical fiber 3 is not limited to that described above.

The collimate lens 4 is a typical lens converting an optical beam emitted from the other end of the optical fiber 3 into a parallel light to supply it to the cylindrical lens 5.

The cylindrical lens 5 is a line focusing lens condensing the parallel light from the collimate lens 4 in a one-dimensional direction. The light condensed on one segment by the cylindrical lens 5 is incident between the parallel planes from the radiation window 1D of the VIPA plate 1.

The cylindrical lens 6 is a line focusing lens condensing the light, which is emitted from the VIPA plate 1 to travel in different directions according to wavelengths, in a direction same as an angular dispersion direction (a $Y_0$-axis direction in the figure) in the VIPA plate 1. Note, a $Z_0$-axis direction of the orthogonal coordinate system $X_0$-$Y_0$-$Z_0$ shown in the figure is coincident with an optical axis direction of the light emitted from the optical fiber 3.

The diffraction grating 7 diffracts the light condensed by the cylindrical lens 6 to a horizontal direction with respect to a plane (X-Z plane) vertical to the angular dispersion direction of the VIPA plate 1 and disperses optical signals of respective wavelengths (channels) contained in the WDM light at different output angles according to wavelengths. Note, in the orthogonal coordinate system X-Y-Z shown in the figure, the $Z_0$-axis is converted into a Z-axis corresponding to a diffraction angle of the diffraction grating 7, and a $X_0$-$Z_0$ plane and the X-Z plane are parallel to each other.

The cylindrical lens 8 is a line focusing lens condensing the output light from the diffraction grating 7 in a direction (a X-axis direction in the figure) same as an angular dispersion angle in the diffraction grating 7. It is preferable that the cylindrical lens 8 is arranged at a position where a distance thereof to the diffraction grating 7 is substantially equal to a distance thereof to the reflecting section 9, on an optical path between the diffraction grating 7 and the reflecting section 9. By arranging the cylindrical lens 8 in this manner, it becomes possible to suppress a loss generated in the present apparatus to be lower.

The reflecting section includes a plurality of three-dimensional mirrors 9-1, 9-2, 9-3, . . . whose reflective surface shapes are different from each other. The reflective surface of each of the three-dimensional mirrors 9-1, 9-2, 9-3, . . . has a curvature surface shape in which a curvature in a Y-axis direction is changed along a X-axis direction, here, a three-dimensional structure which is gradually changed from a convex to a plane, and further, the plane to a concave, in order to vary a compensation amount of the chromatic dispersion in the present apparatus. Further, in order to vary a compensation amount of the dispersion slope in the present apparatus, a change rate of the curvature in the Y-axis direction to the X-axis direction is designed to be different for each three-dimensional mirror. The three-dimensional mirrors 9-1, 9-2, 9-3, . . . having the reflective surfaces as described above are set in line with the reflective surfaces being aligned to the X-axis direction, to be mounted on the movable stage 10. The movable stage 10 is driven by for example a stepping motor or the like, and is freely moved in the X-axis direction. Note, specific shapes of the reflective surfaces of the three-dimensional mirrors 9-1, 9-2, 9-3, . . . will be described later.

Next, there will be described an operation of the present embodiment.

In the chromatic dispersion and dispersion slope compensating apparatus of the above configuration, the WDM light propagated through an optical fiber transmission path, in which the chromatic dispersion is generated, is input to the first port of the optical circulator 2, and is sent to the optical fiber 3 via the second port of the optical circulator 2. The WDM light emitted from the optical fiber 3 is converted into a parallel light by the collimate lens 4 and, then, condensed on one segment by the cylindrical lens 5 and passes through the radiation window 1D of the VIPA plate 1 to be incident on the inside of the substrate 1A. The WDM light incident on the inside of the VIPA plate 1 is multiple-reflected repeatedly between the reflective multilayer films 1B and 1C formed on the parallel planes of the substrate 1A, and every time the WDM light is reflected on the surface of the reflective multilayer film 1B, a few % of the light is transmitted through the surface to be emitted outside the VIPA plate 1.

The emitted lights from the reflective multilayer film 1B side of the VIPA plate 1 interfere mutually and form a plurality of optical beams, traveling directions of which are different from each other, according to wavelengths, for each of the optical signals of respective channels contained in the WDM light, to be angularly dispersed to the $Y_0$-axis direction. Each of the optical beams is condensed by the cylindrical lens 6 in the $Y_0$-axis direction to be incident on the diffraction grating 7. The incident light on the diffraction grating 7 is diffracted to the horizontal direction with respect to the X-Z plane, and the optical signals of respective channels which are angularly dispersed to the X-axis direction are emitted. The light transmitted through the diffraction grating 7 is condensed by the cylindrical lens 8 in the X-axis direction, and reflected by any one of the three-dimensional mirrors of the reflecting section 9.

Here, reflecting positions of the optical signals of respective channels on the three-dimensional mirror will be described in detail.

Figure 3:
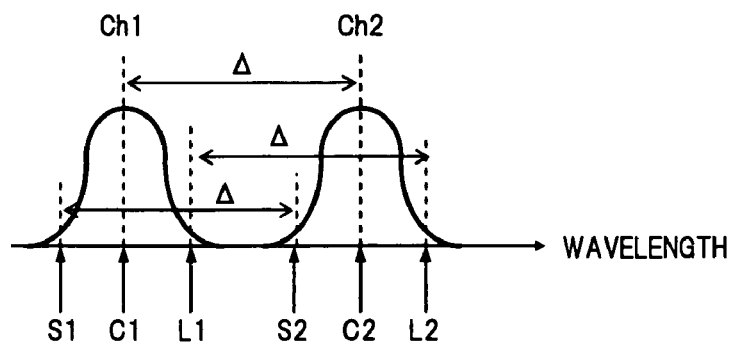
FIG. 3 is a diagram exemplarily showing spectrum waveforms of optical signals having respective wavelengths contained in a WDM light to be input to the apparatus of the above embodiment.

The optical signals of respective channels contained in the WDM light which is input to the present apparatus, as shown in spectrum waveforms of FIG. 3, each has a finite spread in a wavelength direction, since they are modulated. Here, for the optical signals of two channels Ch1 and Ch2 having the wavelength spacing Δ for example, provided that lights thereof on the shorter wavelength side are S1 and S2, lights thereof on the center wavelength are C1 and C2, and lights thereof on the longer wavelength side are L1 and L2, the consideration is specifically made on the reflecting positions of the respective lights on the three-dimensional mirror.

Figure 4:
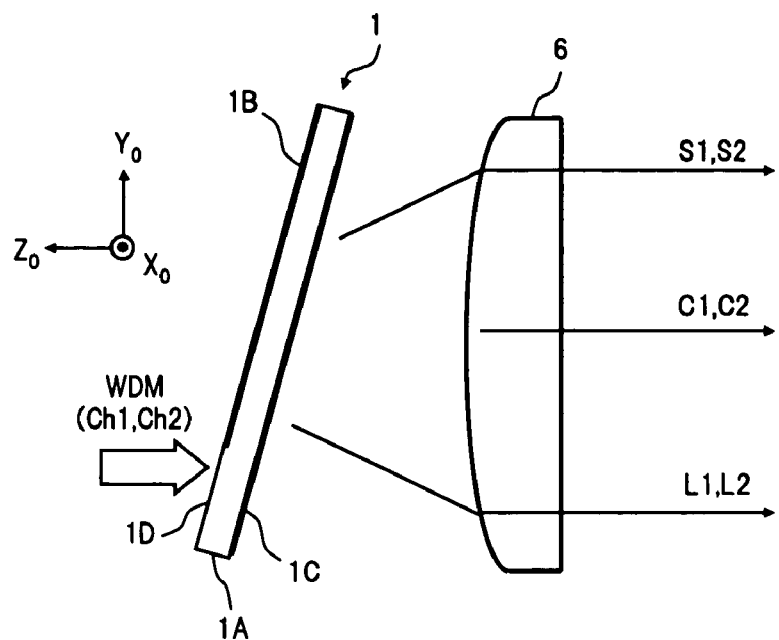
FIG. 4 is a side view showing optical paths of light angularly dispersed on a VIPA plate in the apparatus of the above embodiment.

The WDM light containing the optical signals of respective channels Ch1 and Ch2 is multi-reflected on the VIPA plate 1, so that wavelength components in the same channel are angularly dispersed to the $Y_0$-axis direction. As a result, as shown in a side view of FIG. 4, the lights S1 and S2 of respective channels on the shorter wavelength side are propagated through an optical path on the upper side in the figure, the lights C1 and C2 on the center wavelength are propagated through an optical path on the center in the figure, and the lights L1 and L2 on the longer wavelength side are propagated through an optical path on the lower side in the figure.

Figure 5:
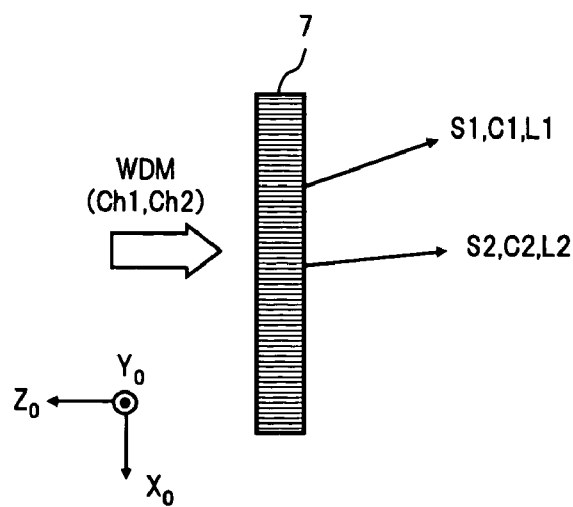
FIG. 5 is a top view showing optical paths of light angularly dispersed on a diffraction grating in the apparatus of the above embodiment.

Then, the optical signals of respective channels Ch1 and Ch2 which are angularly dispersed to the $Y_0$-axis direction by the VIPA plate 1, are transmitted through the diffraction grating 7, to be angularly dispersed to the X-axis direction for each channel. As a result, as shown in a top view of FIG. 5, the lights S1, C1 and L1 of respective wavelengths in the channel Ch1 are propagated through an optical path on the left side of a traveling direction (upper side in the figure), and the lights S2, C2 and L2 of respective wavelengths in the channel Ch2 are propagated through an optical path on the right side of the traveling direction (lower side in the figure).

Figure 6:
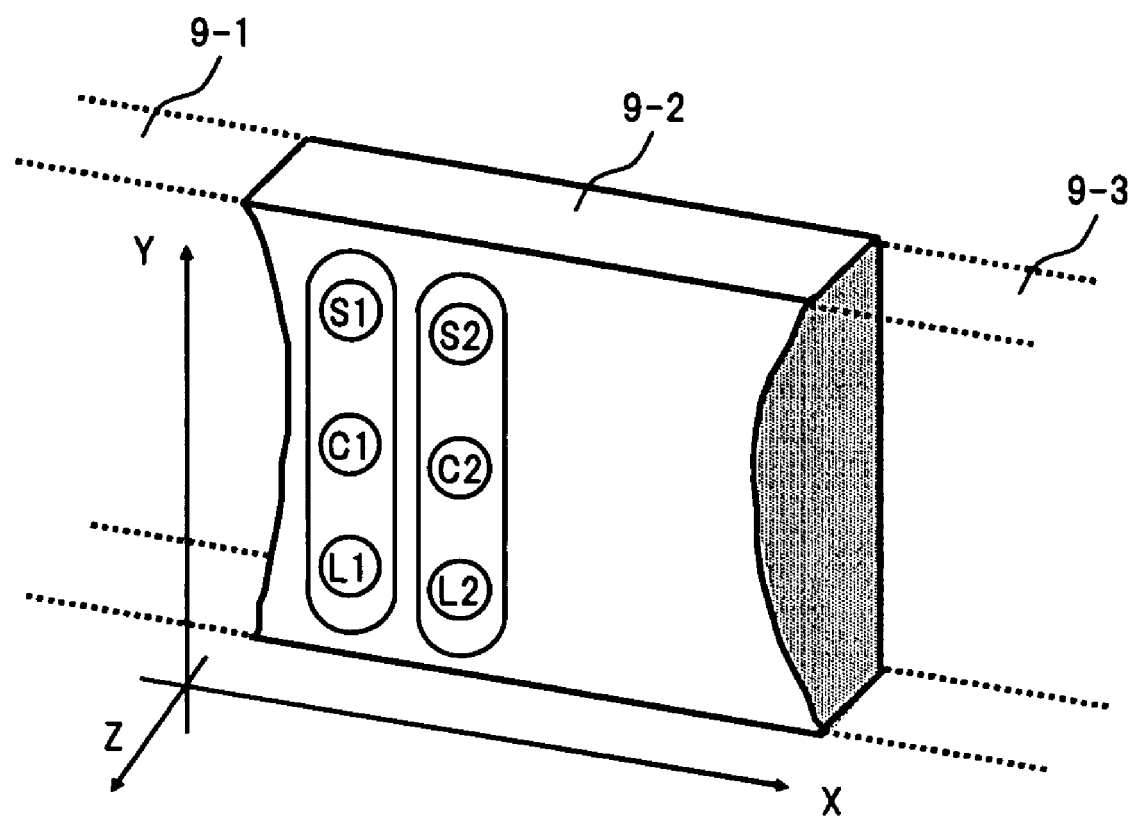
FIG. 6 is a perspective view showing reflecting positions of the optical signals on a three-dimensional mirror in the apparatus of the above embodiment.

Accordingly, on the three-dimensional mirror of the reflecting section 9, as shown in a perspective view of FIG. 6, the lights S1, C1 and L1 of respective wavelengths in the channel Ch1 are reflected at different Y-coordinates on the same X-coordinate, and the lights S2, C2 and L2 of respective wavelengths in the channel Ch2 are reflected at different Y-coordinates on the same X-coordinate which is different from the X-coordinate at which the lights S1, C1 and L1 in the channel Ch1 are reflected.

For the optical signals of respective channels reflected by the three-dimensional mirror as described in the above, the respective wavelength components travel in different directions according to the curved surface shape of the reflective surface, and the optical paths thereof are deviated when they are returned to the VIPA plate 1, so that different wavelength components are propagated for different distances. As a result, the variable compensation of the chromatic dispersion and the dispersion slope is performed for the optical signals of respective channels.

Here, the variable compensation of the chromatic dispersion and the dispersion slope in the present apparatus will be described in detail.

As shown in FIG. 3, the optical signals of respective channels contained in the WDM light each has the finite spread in the wavelength direction. Accordingly, since a propagation speed in the optical fiber or the optical device of the component on the shorter wavelength side is different from a propagation speed in the optical fiber or the optical device of the component on the longer wavelength side, the waveforms of the optical signals are distorted and consequently, the transmission quality is degraded. The performance of the chromatic dispersion compensation and the dispersion slope compensation-independent of each other means that a differential group delay between the shorter wavelength side and the longer wavelength side is compensated, for the optical signals of all channels. Namely, in the example of FIG. 3, a differential group delay between the light S1 on the shorter wavelength side and the light L1 on the longer wavelength side is compensated, for the channel Ch1, and a differential group delay between the light S2 on the shorter wavelength side and the light L2 on the longer wavelength side is compensated, for the channel Ch2.

The variable compensation of the chromatic dispersion in the present apparatus is basically performed in the same manner as in a chromatic dispersion compensator utilizing a conventional VIPA. To be specific, the description is made on the optical signal of channel Ch1 shown in FIG. 3 for example. The light S1 on the shorter wavelength side, the light C1 on the center wavelength and the light L1 on the longer wavelength side are reflected at the different Y-coordinates on the same X-coordinate on the three-dimensional mirror as shown in FIG. 6. As a result, since the optical path lengths for the respective lights are different from each other so that the chromatic dispersion is generated, the chromatic dispersion compensation is performed, for the optical signal of channel Ch1. The compensation amount of the chromatic dispersion at this time is determined depending on the curvature in the Y-axis direction of the three-dimensional mirror. The reflective surface shape of the three-dimensional mirror is designed such that the curvature in the Y-axis direction is changed along the X-axis direction. Therefore, the entirety of the three-dimensional mirror is moved to the X-axis direction, to change the X-coordinate on the three-dimensional mirror, at which the lights S1, C1 and L1 of respective wavelengths are reflected. Thus, it becomes possible to vary the chromatic dispersion which is to be given to the optical signal of channel Ch1, thereby enabling the variable compensation of the chromatic dispersion.

On the other hand, the variable compensation of the dispersion slope in the present apparatus is realized such that the optical signals of respective channels contained in the WDM light, which have been angularly dispersed to the $Y_0$-axis direction by the VIPA plate 1 for each channel, are angularly dispersed to the X-axis direction by the diffraction grating 7 and are reflected by any one of the plurality of three-dimensional mirrors 9-1, 9-2, 9-3, . . . , in which the change rates of the curvatures in the Y-axis direction to the X-axis direction are different from each other, to be returned to the VIPA plate 1. To be specific, the dispersion slope compensation for the two channels Ch1 and Ch2 shown in FIG. 3 will be described. The optical signals of channels Ch1 and Ch2 are reflected at the different X-coordinate positions on the three-dimensional mirror as shown in FIG. 6. The curvature in the Y-axis direction of a single three-dimensional mirror is changed along the X-axis direction. Therefore, the chromatic dispersions of different values are given to the optical signals of respective channels Ch1 and Ch2. Namely, the dispersion slope is compensated. The compensation amount of the dispersion slope at this time is determined depending on a diffraction angle of the diffraction grating 7 and the change rate of the curvature in the Y-axis direction to the X-axis direction of the three-dimensional mirror which reflects the optical signals of the channels Ch1 and Ch2. In the present apparatus, the diffraction angle of the diffraction grating 7 is made fixed, and the plurality of three-dimensional mirrors 9-1, 9-2, 9-3, . . . , in which the change rates of the curvatures in the Y-axis direction to the X-axis direction are different from each other, are set in the X-axis direction to be moved to the X-axis direction, so that the three-dimensional mirror for reflecting the optical signals of respective channels Ch1 and Ch2 can be replaced. As a result, a difference of a chromatic dispersion value to be given to the optical signals of respective channels Ch1 and Ch2 is different for each three-dimensional mirror, and thus, it becomes possible to variably compensate for the dispersion slope.

Note, in the present apparatus, the diffraction angle of the diffraction grating 7 is made fixed, and the plurality of three-dimensional mirrors is disposed, so that the compensation amount of the dispersion slope is made variable. If a diffraction grating whose diffraction angle is variable is applied and a single three-dimensional mirror is disposed, it is also possible to realize the variable compensation of the dispersion slope (refer to Japanese Patent Application No. 2004-89740). However, in the case where the diffraction angle of the diffraction grating is varied to control the dispersion angle in the X-axis direction of the optical signals of respective channels so that the compensation amount of the dispersion slope is varied, a separate mechanism for varying the diffraction angle is necessary, and additionally, it is necessary to adjust circularly the position of the three-dimensional mirror in accordance with a variation of the diffraction angle. Therefore, there is a drawback in that the mechanism controlling the position of the three-dimensional mirror becomes complicated. On the other hand, in the present apparatus, since the diffraction grating having the fixed diffraction angle is used, the diffraction angle variable mechanism is unnecessary. The position control of the three-dimensional mirror can be realized if a mechanism enabling the linear movement in the X-axis direction of the three-dimensional mirror, that is, a mechanism same as a conventional VIPA-type chromatic dispersion compensator, is applied. Therefore, the control mechanism is not complicated.

Next, there will be described the specific examples of the plurality of three-dimensional mirrors used in the reflecting section 9 realizing the above described variable compensation of the dispersion slope.

Figure 7:
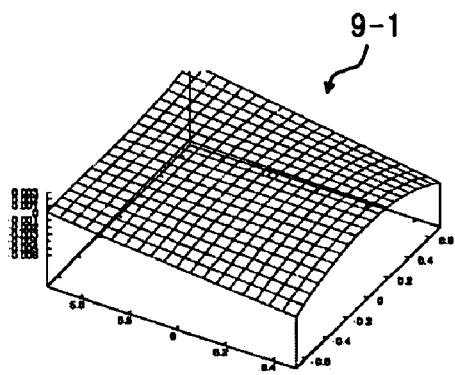
FIG. 7 is a diagram showing examples of specific shapes of a plurality of three-dimensional mirrors used in the apparatus of the above embodiment.
Figure 7:
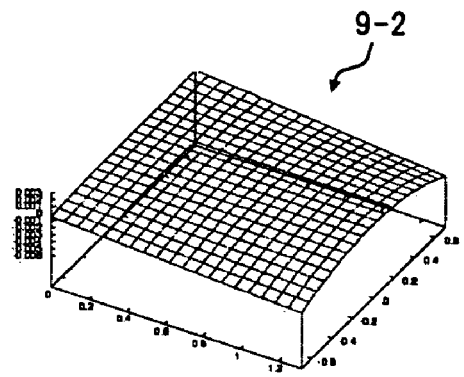
Figure 7:
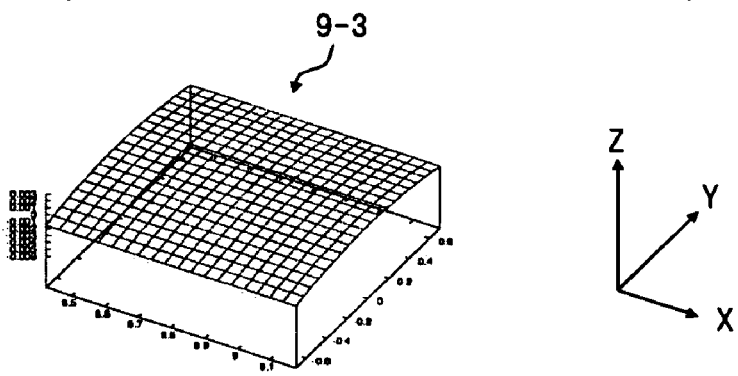
Figure 7:
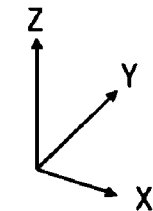
Figure 7:
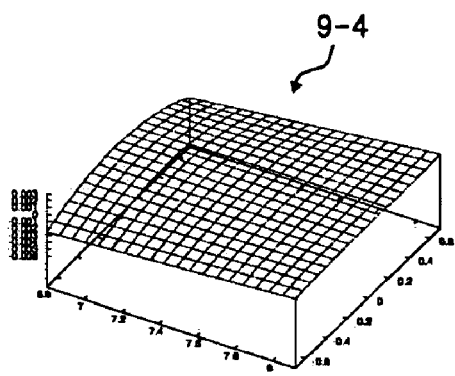
Figure 7:
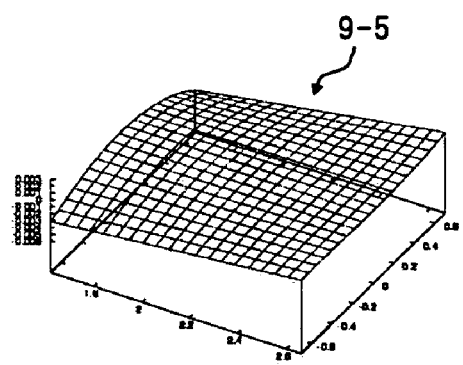

Here, for example, the assumption is made on the case where, for the optical signals of respective channels contained in the WDM light, the chromatic dispersion in a range of $-100$ ps/nm to $+100$ ps/nm and the dispersion slope in a range of $-10$ ps/nm$^2$ to $+10$ ps/nm$^2$ are variably compensated independent of each other. In this case, as shown in FIG. 7 for example, there are used the three-dimensional mirrors 9-1 to 9-5 which realize the dispersion slopes of $-10$ ps/nm$^2$, $-5$ ps/nm$^2$, 0 ps/nm$^2$, $+5$ ps/nm$^2$, and $+10$ ps/nm$^2$, respectively. The shapes of the reflective surfaces of the three-dimensional mirrors 9-1 to 9-5 are represented by the next formula (1).

$$z(x,y)=\{A1 \cdot x + A2 \cdot x^2\} \cdot y^4 + \{A3 \cdot x + A4 \cdot x^2\} \cdot y^3 + \{A5 \cdot x + A6 \cdot x^2 + A7\} \cdot y^2 \quad (1)$$

In the above formula, the center of the three-dimensional mirror is x=0, Y=0. Further, coefficients A1 to A7 are different from each other depending on a dispersion slope value to be realized. The next table 1 collects the coefficients A1 to A7 in the formula (1) for the three-dimensional mirrors 9-1 to 9-5 for realizing the above five dispersion slopes.

TABLE 1

| | Dispersion Slope Value | | | | |
| --- | --- | --- | --- | --- | --- |
| Coefficient | $-10$ ps/nm$^2$ | $-5$ ps/nm$^2$ | 0 ps/nm$^2$ | $+5$ ps/nm$^2$ | $+10$ ps/nm$^2$ |
| A1 | −0.0002867987 | −0.0001433993 | 0.0000000000 | 0.0001433993 | 0.0002867987 |
| A2 | 0.0000065546 | 0.0000032773 | 0.0000000000 | −0.0000032773 | −0.0000065546 |
| A3 | −0.0031034602 | −0.0015517301 | 0.0000000000 | 0.0015517301 | 0.0031034602 |
| A4 | 0.0000709281 | 0.0000354640 | 0.0000000000 | −0.0000354640 | −0.0000709281 |
| A5 | −0.0083956679 | −0.0041978340 | 0.0000000000 | 0.0041978340 | 0.0083956679 |
| A6 | 0.0001918789 | 0.0000959395 | 0.0000000000 | −0.0000959395 | −0.0001918789 |
| A7 | −0.0030868480 | −0.0030868480 | −0.0030868480 | −0.0030868480 | −0.0030868480 |

The above described five three-dimensional mirrors 9-1 to 9-5 having different reflective surface shapes are set in line with the reflective surfaces being aligned to the X-axis direction, to be mounted on the movable stage 10. Then, the movable stage 10 is slid to the X-axis direction, so that the three-dimensional mirror which is coincident with or closest to the dispersion slope value which is to be compensated, is set to be within a condensation range of the emitted light from the cylindrical lens 8. Further, the movable stage 10 is finely adjusted to the X-axis direction, so that the chromatic dispersion value can be varied within the range of −100 ps/nm to +100 ps/nm while keeping the above dispersion slope value.

As a specific example of the diffraction grating 7 in the case where the above described three-dimensional mirrors 9-1 to 9-5 are used, it is possible that the number of grating grooves in the diffraction grating 7 is set to 667/nm for example. The WDM light dispersed by this diffraction grating 7 is reflected at a position different by about 14 μm in the X-axis direction on the three-dimensional mirror, if the wavelength is different by 1 nm. Namely, when the wavelength band of the WDM light is 40 nm for example, a range held by the WDM light on the three-dimensional mirror is 560 μm in the X-axis direction. Therefore, it is possible to compensate for the chromatic dispersion and the dispersion slope of the optical signals of all channels contained in the WDM light, by using the three-dimensional mirrors having the reflective surface shapes as exemplarily shown in FIG. 7.

Note, the configurations of the plurality of three-dimensional mirrors and the diffraction grating used in the present invention are not limited to the above specific examples.

Next, there will be described an effect for when the chromatic dispersion and dispersion slope compensating apparatus of the present embodiment as described above is applied to an optical transmission system, with reference to a specific case example.

Figure 8:
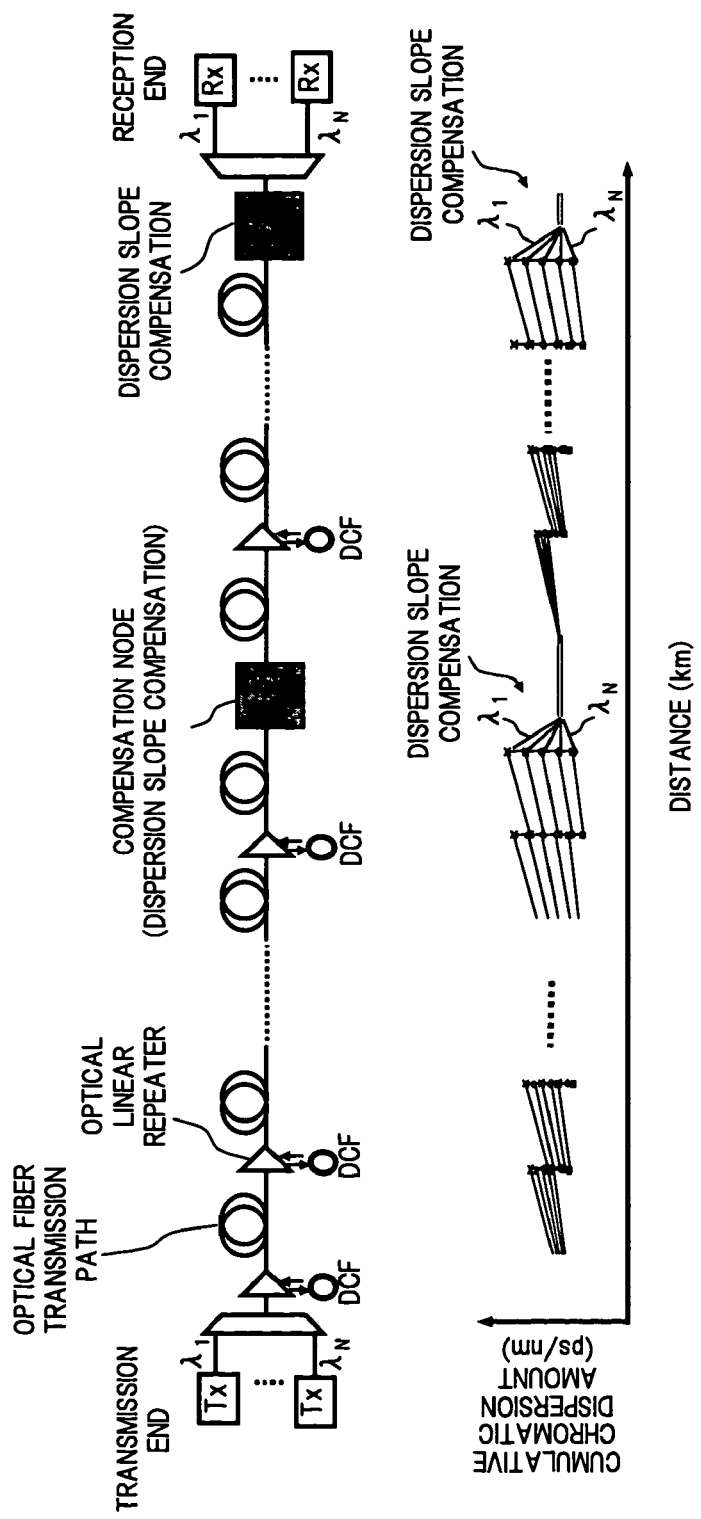
FIG. 8 is a diagram showing one example of an optical transmission system suitable to be applied with the apparatus of the above embodiment.
Figure 9:
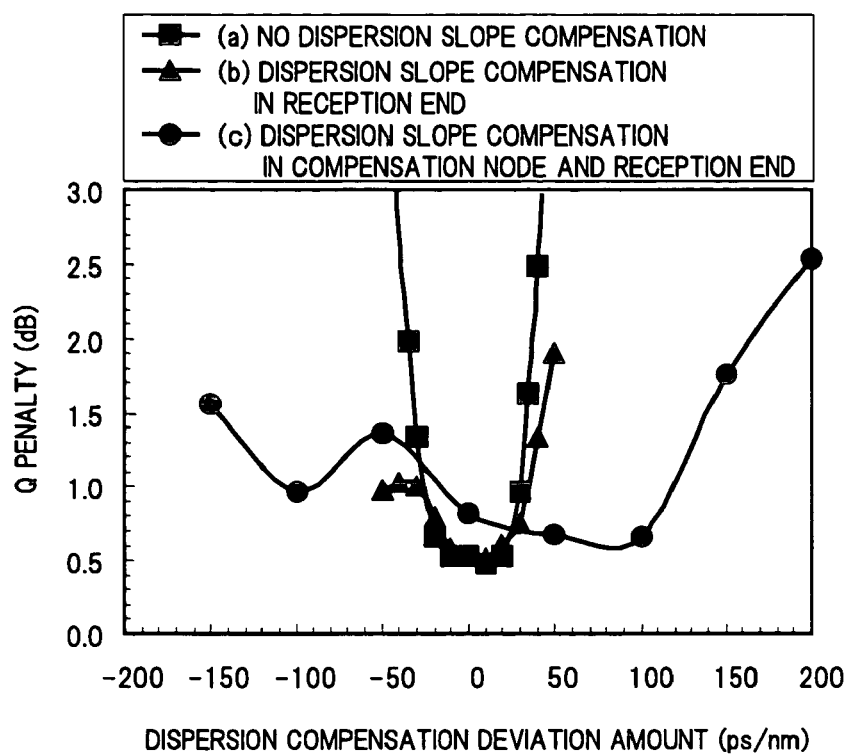
FIG. 9 is a graph for explaining an effect of the dispersion slope compensation in the optical transmission system in FIG. 8.

FIG. 8 is a diagram showing one example (upper part in the figure) of an optical transmission system in which a compensation node (CN) is disposed for each several nodes to perform the dispersion slope compensation, and a map (lower part in the figure) of a cumulative chromatic dispersion amount in the optical transmission system. Further, FIG. 9 shows one example of the comparison of a penalty to the dispersion compensation deviation per one optical linear repeater, in the cases: (a) the dispersion slope compensation is not performed; (b) the dispersion slope compensation is performed only in a reception end; and (c) the dispersion slope compensation is performed in both of the compensation node and the reception end, relating to the optical transmission system in FIG. 8.

As shown in the configuration example of the optical transmission system in FIG. 8, it is apparent from the example of FIG. 9 that the dispersion slope compensation is performed not only in the reception end and also in the compensation node disposed on the halfway of the optical fiber transmission path, so that the deterioration of transmission quality due to the deviation of the chromatic dispersion compensation amount can be effectively suppressed. Therefore, it is significantly effective that the present apparatus is applied to the compensation node or the reception end as described above, to perform the dispersion slope compensation independent of the chromatic dispersion compensation.

Figure 10:
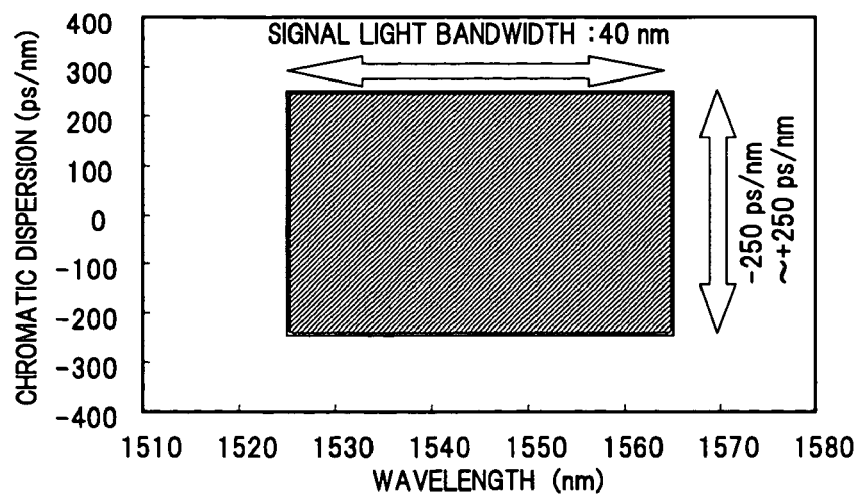
FIG. 10 is a graph showing one example of a chromatic dispersion value of the WDM light to be input to a compensation node in the optical transmission system in FIG. 8.
Figure 11:
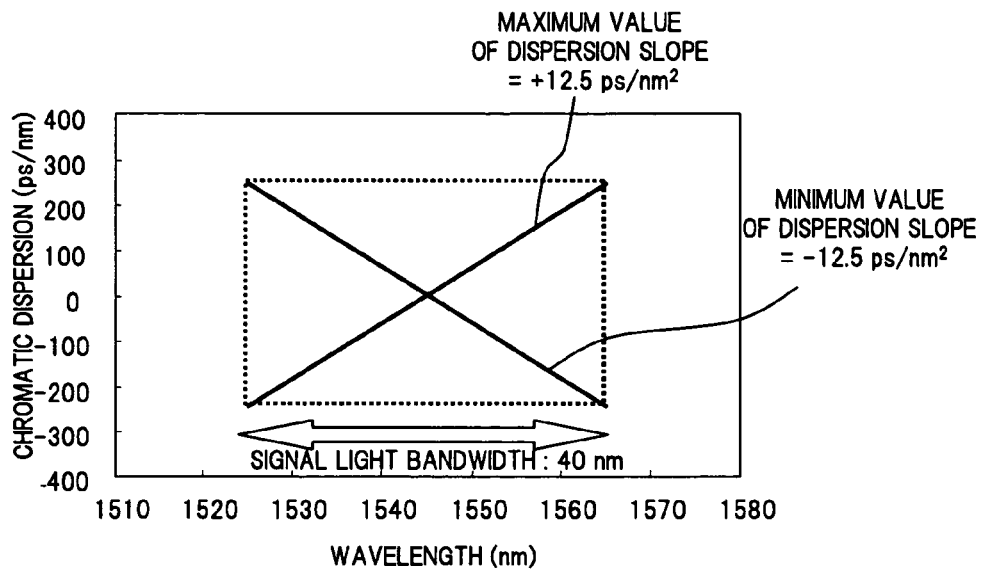
FIG. 11 is a graph showing the dispersion slope corresponding to the example in FIG. 10.

To be specific, in the optical transmission system shown in FIG. 8, it is assumed that the chromatic dispersion of the WDM light input to the compensation node is fluctuated in a range of −250 ps/nm to +250 ps/nm over the total wavelength band as shown in FIG. 10 for example. Note, the causes of the fluctuation are the deviation of the chromatic dispersion value per fiber unit length, the deviation of the dispersion slope value, a variation of temperature, a dispersion compensation fiber (DCF) menu step, a dispersion value measurement error and the like. In the situation as shown in FIG. 10, if the bandwidth of the WDM light is 40 nm, the dispersion slope of the WDM light input to the compensation node becomes +12.5 ps/nm$^2$ in maximum value and −12.5 ps/nm$^2$ in minimum value as shown in FIG. 11.

In the above case, the chromatic dispersion and dispersion slope compensating apparatus using the five three-dimensional mirrors 9-1 to 9-5 shown in FIG. 7 is applied to the compensation node, so that the dispersion slope deviation of −12.5 ps/nm$^2$ to +12.5 ps/nm$^2$ is reduced to ⅒, that is, the dispersion slope of −1.25 ps/nm$^2$ to +1.25 ps/nm$^2$, as shown in the following table 2.

TABLE 2

| Dispersion Slope Range to be Compensated (ps/nm$^2$) | Dispersion Slope Menu to be Applied (ps/nm$^2$) | Dispersion Slope after Compensation (ps/nm$^2$) |
| --- | --- | --- |
| −12.5 to +7.5 | −10 | −1.25 to +1.25 |
| +7.5 to +2.5 | −5 | −1.25 to +1.25 |
| +2.5 to −2.5 | 0 | −1.25 to +1.25 |
| −2.5 to −7.5 | +5 | −1.25 to +1.25 |
| −7.5 to −12.5 | +10 | −1.25 to +1.25 |

As described in the above, according to the chromatic dispersion and dispersion slope compensating apparatus in the present embodiment, the plurality of three-dimensional mirrors may be moved only to the X-axis direction in order to variably compensate for the dispersion slope. It is possible to utilize a moving mechanism (for example, the driving of the movable stage by the stepping motor or the like) similar to that in the conventional VIPA-type chromatic dispersion compensator, for moving the three-dimensional mirrors. Therefore, it becomes possible to variably compensate for the chromatic dispersion and the dispersion slope independent of each other, without the complication of the control mechanism. Further, differently from the conventional VIPA-type chromatic dispersion compensator, there is an advantage in that the present apparatus can be realized by the slight modification in which the fixed diffraction grating and the plurality of three-dimensional mirrors having different shapes are added. Consequently, it becomes possible to provide the chromatic dispersion and dispersion slope compensating apparatus which is easy to be in practical use and is at a low cost.

Note, in the above embodiment, there has been shown the specific example in which five three-dimensional mirrors are used. However, the number of three-dimensional mirrors used in the present invention is not limited to the above example, and it is possible to use two or more arbitrary numbers of three-dimensional mirrors according to the range of the dispersion slope to be compensated and the wavelength band of the WDM light, the accuracy of the dispersion slope compensation or the like.

Further, there has been shown the configuration in which the emitted light from the VIPA plate 1 is condensed by the cylindrical lens 6 to be sent to the diffraction grating 7, and further, the light transmitted through the diffraction grating 7 is condensed by the cylindrical lens 8 to be sent to the reflecting section 9. However, the configuration may be such that, in place of the cylindrical lenses 6 and 8 disposed on the front and rear of the diffraction grating 7, a focusing lens condensing the light transmitted through the diffraction grating 7 on one segment for each of the wavelengths of respective channels, is disposed between the diffraction grating 7 and the reflecting section 9. In this case, if a distance from the diffraction grating 7 to the focusing lens and a distance from the focusing lens to the reflecting section 9 are set to be substantially equal to each other, it becomes possible to suppress the loss generated in the present apparatus to be lower.

Figure 12:
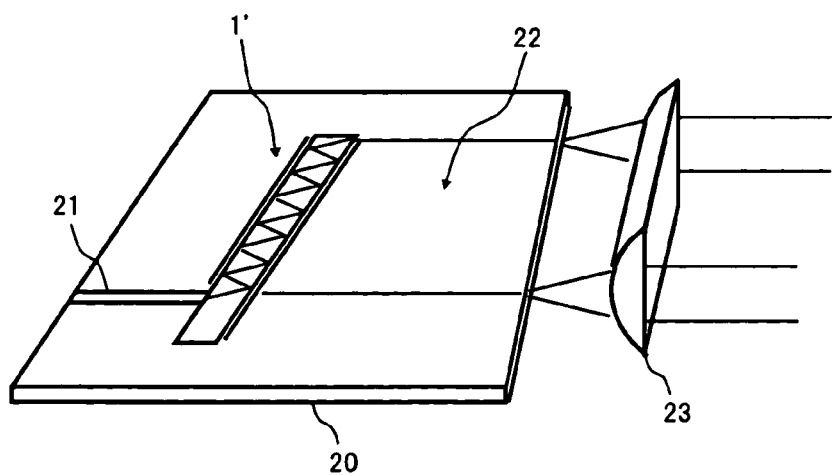
FIG. 12 is a diagram showing a configuration example of a waveguide-type VIPA.

Moreover, there has been shown the configuration example utilizing the bulk-type VIPA. However, the VIPA applicable to the present invention is not limited to the bulk-type VIPA, and it is also possible to utilize a waveguide-type VIPA as shown in FIG. 12 for example. To be specific, in the configuration example of FIG. 12, a VIPA plate 1' is disposed on an end portion of a single waveguide 21 formed on a substrate 20. A light multi-reflected on the VIPA plate 1' is propagated through a slab waveguide 22 formed on the surface of the substrate 20 to interfere with each other, and emitted from an end face of the substrate 20 at different angles for each wavelength. The emitted light from the substrate 20 passes through a cylindrical lens 23 to be a parallel light angularly dispersed to a direction parallel to the surface of the substrate 20. A state of the light output from the cylindrical lens 23 becomes same as the light output from the bulk-type VIPA plate 1. By utilizing such a waveguide-type VIPA, it is also possible to achieve the function and effect similar to those in the case where the bulk-type VIPA is utilized.

What is claimed is:

1. A chromatic dispersion and dispersion slope compensating apparatus comprising:

an optical system which receives a wavelength division multiplexed light containing a plurality of optical signals having different wavelengths, and condenses said wavelength division multiplexed light in a one-dimensional direction to output it;

an optical component including two reflective surfaces which are opposed and parallel to each other, in which the wavelength division multiplexed light output from said optical system is incident between said reflective surfaces, and a part of the incident light is transmitted through one of said reflective surfaces while the incident light being multiple-reflected on said respective reflective surfaces, and then, the transmitted light interferes mutually, so that, for each of the optical signals of respective wavelengths contained in said wavelength division multiplexed light, the light dispersed to a first direction at different angles according to wavelengths is output;

a diffraction grating which disperses the optical signals of respective wavelengths output from said optical component to a second direction vertical to said first direction at different angles according to wavelengths;

a reflecting section that comprises a plurality of three-dimensional mirrors each having a reflective surface of curved shape whose curvature in said first direction is changed along said second direction, in which change rates of the curvatures in said first direction to said second direction are different from each other; and a movable stage in which the plurality of three-dimensional mirrors of said reflecting section are moved to said second direction corresponding to respective compensation amounts of the chromatic dispersion and the dispersion slope, and the optical signals of respective wavelengths output from said diffraction grating are reflected by any one of the plurality of three-dimensional mirrors of said reflecting section, and then, the reflected light is returned to said optical component via said diffraction grating.

2. A chromatic dispersion and dispersion slope compensating apparatus according to claim 1, wherein the plurality of three-dimensional mirrors of said reflecting section are set in line with the respective surfaces thereof being aligned to said second direction.

3. A chromatic dispersion and dispersion slope compensating apparatus according to claim 1, wherein said movable stage moves the plurality of three-dimensional mirrors of said reflecting section to said second direction, so that the reflective surface of the three-dimensional mirror which is selected from the plurality of three-dimensional mirrors of said reflecting section according to the compensation amount of the dispersion slope, is within a range where the optical signals of respective wavelengths output from said diffraction grating reach, and further, the optical signals of respective wavelengths output from said diffraction grating are reflected at a position corresponding to the compensation amount of the chromatic dispersion on the reflective surface of said selected three-dimensional mirror.

4. A chromatic dispersion and dispersion slope compensating apparatus according to claim 1, further comprising:

a first lens condensing the optical signals of respective wavelengths output from said optical component in said first direction to give them to said diffraction grating; and a second lens condensing the optical signals of respective wavelengths output from said diffraction grating in said second direction to give them to said reflecting section.

5. A chromatic dispersion and dispersion slope compensating apparatus according to claim 4, wherein a distance from said diffraction grating to said second lens and a distance from said second lens to said reflecting section are set to be substantially equal to each other.

6. A chromatic dispersion and dispersion slope compensating apparatus according to claim 1, further comprising;

a lens condensing the optical signals of respective wavelengths output from said diffraction grating to one point for each wavelength component thereof to give them to said reflecting section.

7. A chromatic dispersion and dispersion slope compensating apparatus according to claim 6, wherein a distance from said diffraction grating to said lens and a distance from said lens to said reflecting section is set to be substantially equal to each other.

* * * * *